United States Patent
Conti et al.

(10) Patent No.: US 6,522,995 B1
(45) Date of Patent: Feb. 18, 2003

(54) METHOD AND APPARATUS FOR WEB-BASED CONTROL OF A WEB-BASED WORKLOAD SIMULATION

(75) Inventors: Thomas W. Conti, Poughkeepsie, NY (US); David M. Morlitz, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,807

(22) Filed: Dec. 28, 1999

(51) Int. Cl.[7] .......................... G06F 9/455; G06F 11/34
(52) U.S. Cl. .......................... 702/186; 703/22; 702/183
(58) Field of Search .............................. 714/43, 31, 25; 703/22, 13; 709/220, 225, 206, 207, 228; 702/186, 119, 188, 183

(56) References Cited

U.S. PATENT DOCUMENTS

| | | | |
|---|---|---|---|
| 5,732,213 A | | 3/1998 | Gessel et al. ............... 709/224 |
| 5,737,517 A | | 4/1998 | Kite et al. ..................... 714/38 |
| 5,812,750 A | | 9/1998 | Dev et al. ...................... 714/4 |
| 5,812,780 A | * | 9/1998 | Chen et al. .................. 709/224 |
| 5,812,826 A | | 9/1998 | McLain, Jr. .................. 703/27 |
| 5,819,066 A | * | 10/1998 | Bromberg et al. .......... 395/500 |
| 5,854,889 A | * | 12/1998 | Liese et al. .................... 714/43 |
| 5,974,572 A | * | 10/1999 | Weinburg et al. ............. 714/47 |
| 6,002,871 A | * | 12/1999 | Duggan et al. ............... 714/38 |
| 6,044,398 A | * | 3/2000 | Marullo et al. ............. 709/219 |
| 6,167,534 A | * | 12/2000 | Straathof et al. ............. 714/38 |
| 6,189,031 B1 | * | 2/2001 | Badger et al. ............... 709/224 |
| 6,223,306 B1 | * | 4/2001 | Silva et al. .................... 714/37 |
| 6,304,982 B1 | * | 10/2001 | Mongan et al. ............... 714/38 |
| 6,317,786 B1 | * | 11/2001 | Yamane et al. ............. 709/224 |
| 6,360,332 B1 | * | 3/2002 | Weinberg et al. .............. 714/4 |

OTHER PUBLICATIONS

Duggin, Lantz, Sedlak, Thul—"Multi–User Application Program Testing Tool for Stress and Regression Testing of Application Programs", 1999 Derwent Information 2000–096200.*

* cited by examiner

*Primary Examiner*—Marc S. Hoff
*Assistant Examiner*—Paul Kim
(74) *Attorney, Agent, or Firm*—Scully, Scott, Murphy & Presser; William A. Kinnaman, Jr.

(57) ABSTRACT

A system and method for dynamically testing a web-based server device on multiple platforms. Test scripts are provided to one or more test devices for simulating one or more web-based users for testing the web-based server. A database associated with the web-based server stores test configuration and test parameter information in varying degrees of granularity for each simulated web-based user. This test configuration and test parameter information is retrieved from the database according to the desired test simulation and a web-based communication, e.g., HTML web-page, is downloaded to the test scripts via a control device for initiating the simulation. A further web-based communication is generated for access by a test script which includes information enabling dynamic control of the test devices during a test simulation.

18 Claims, 9 Drawing Sheets

METHOD AND APPARATUS FOR WEB-BASED CONTROL OF A WEB-BASED WORKLOAD SIMULATION

BACKGROUND OF THE INVENTION

1. Field of the Invention

The present invention is directed to Web-based sever testing tools and, particularly, to an improved method for enhancing control of Web-based server testing.

2. Discussion of the Prior Art

Web application and database server testing tools, such as Segue Software's SilkPerformer running on Windows NT do not provide adequate methods of control at the granularity level required.

SilkPerformer is a tool that enables simulation of worldwide web users of an e-business site. As a single NT machine does not have the capacity required to "stress-test" an S/390 server (for example), SilkPerformer's "multi-machine" option may be implemented to invoke simulation "agents" on multiple NT machines, which are controlled at a central NT workstation, to increase the number of virtual users participating in the simulation. Due to the structure inherent in both Windows NT and the Segue product, there is no method for operator manipulation of the "path" or parameters of the workload once it has been started. There is additionally no method available to view, from a global perspective, the cumulative status of the test as it is being run as Segue only writes test statistics to the repository at the conclusion of the test.

It would thus be highly desirable to provide, in a web-based server test scenario, an additional level of control so that a test operator could dynamically "focus" the test on any specific function that needs further testing. This level of control is required to ensure that the test operator may manipulate the test as it progresses to either correct or prevent errors from occurring which may adversely affect the outcome of the test. Via the use of cumulative statistics, an operator may become immediately aware of any problem or may be able to notice trends leading to a failure situation.

SUMMARY OF THE INVENTION

It is an object of the present invention to provide a platform-independent, self-adjusting control and execution system for testing and simulating users of a web server.

It is a further object of the present invention to provide an enhancement for a web-based test tool to provide greater control over simulation of users accessing a web server of an e-business site.

It is another object of the present invention to provide an enhancement for a web-based test tool to provide control over simulation of users accessing a web server of an e-business site by enabling the test operator to manipulate the test as it progresses to either correct or prevent errors from occurring which may adversely affect the outcome of the test.

Thus in accordance with the invention there is provided a control mechanism to be used in conjunction with a web-based server testing tool that provides a level of control required to meet a comprehensive set of testing requirements. In order to achieve the required testing level granularity, and provide test-tool independence, the inventive control mechanism is provided external to a web-based server testing tool. As the tool is web-based, control over the web-based workload is enhanced.

The inventive tool is implemented for testing web-based products, and requires the simple configuration of test agents to operate as the workload would. A database, such as DB2 (v.6.1), may be implemented for storing all of the configuration information and Net.Data and IBM HTTP Server 5.2 product may be implemented for providing the pathway which delivers test configuration information to a "web-aware" client. Using the same pathway, information about the progress of any ongoing testing is stored in DB2 during test execution. Once these statistics exist in DB2, the strong analytical ability of the database is utilized to produce a web-page, via a Net.Data macro, that would provide a global view of the ongoing tests to the operator. The design which meets all of the aforementioned criterion requires a plurality of DB2 tables. For example, at least six (6) DB2 tables may be implemented which are related to one another to provide an extremely flexible method of delivering test configuration options to each "virtual" user as they request this information. The granularity of control using the present invention ranges to one parameter set for the entire test all the way down to having a different parameter set for each "virtual" user. Further tables may be implemented, for example, to contain log data in the following categories: response time, errors, and good/bad count, and further, to include information about each transaction that is available.

Advantageously, the testing tool enhancement of the invention is self-adjusting, providing "feed-back" information which may be used to automatically adjust test parameters and terminate malfunctioning tests, thereby optimizing the test environment. Furthermore, the present invention may be used by any web-based testing tool provided that the test tool can parse HTML pages and extract data into variables, and, moreover, may be implemented on a variety of system platforms.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
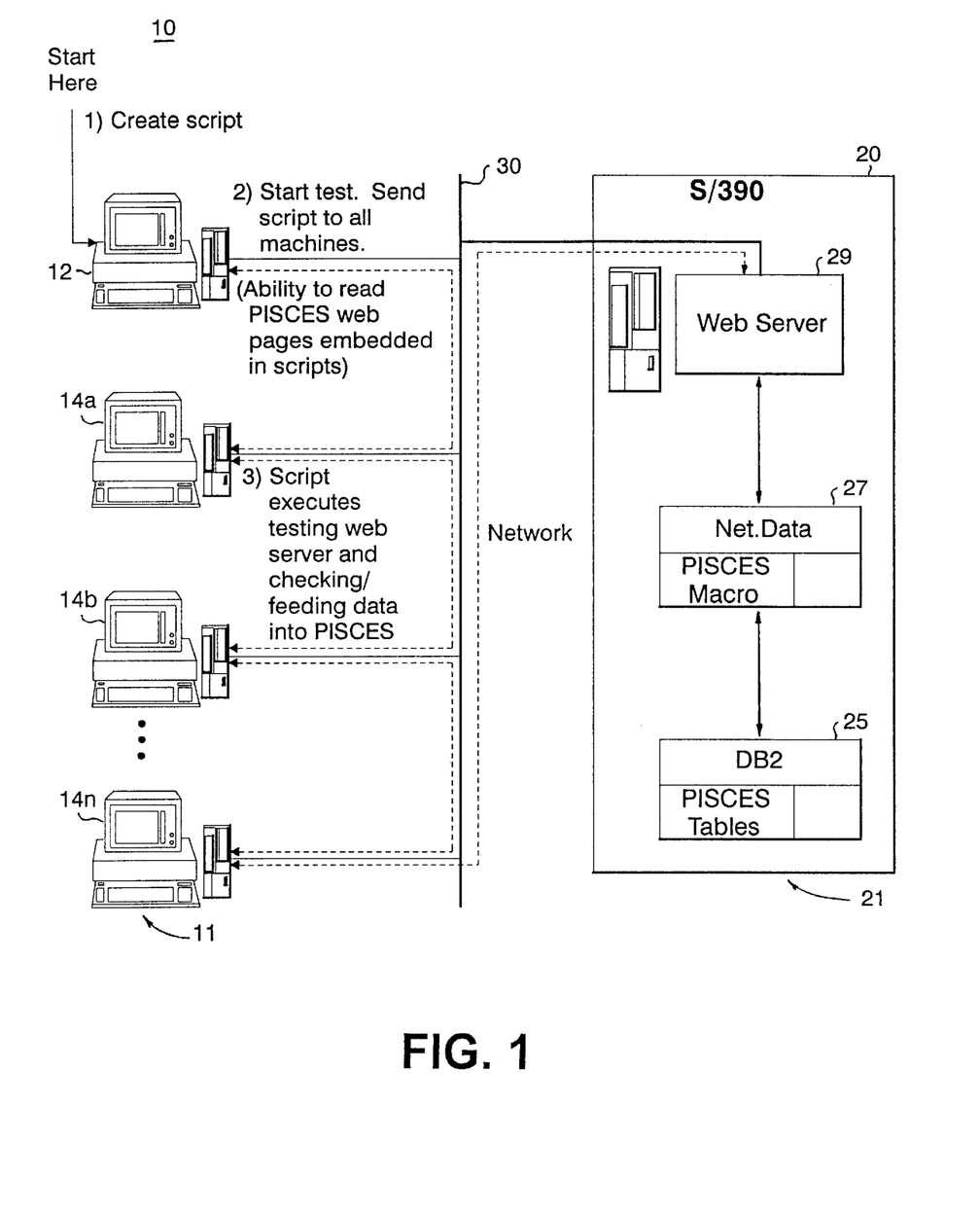
FIG. 1 is a diagram illustrating the physical architecture of the web-based test-tool.

FIG. 1 illustrates the web-server test system 10 according to the present invention. As shown in FIG. 1, the system includes a computer control device 12, configured with the Segue SilkPerformer test control or similar web-based test control device, and a plurality of user test agents, comprising computer terminals 14a–14n, which may be NT workstations, that execute testing scripts in accordance with control commands from the control device 12 for simulating one or more users of varying types for testing a web server device 20, for example, an IBM S/390. It is understood that each of the test control and test agent devices are web-browser configured for communicating with the server 20 over a network 30, such as the Internet and, according to the invention, are capable of executing testing scripts and receiving web page data generated by the test system of the invention. Further, in the manner as described in detail below, the test scripts further include commands for "reading" and extracting specified data from a web page. It should be understood that although the IBM S/390 is shown depicted in the FIG. 1, the method and apparatus of the invention may be implemented for use on a variety of system platforms including, but not limited to: OS/390, AIX, NT, OS/400, OS/2, SCO, Solaris, HP-UX, and Linux.

At the web server 20, a database 25, such as DB2, is provided for storing all of the configuration and test parameter information which is retrievable by a database connector such as IBM's "Net.data" macro product 27. Operating in conjunction with the Net.data DB connecting product is a web-server device 29, such as an IBM HTTP Server 5.2 product, which provides the pathway for delivering test configuration information to the "web-aware" agents 14a–14n. Using the same pathway, information about the progress of any ongoing testing is stored in the database 25. These statistics may be stored in the database 25, for instance, in a plurality of DB2 tables, as will be described in greater detail. The strong analytical ability of the database, enables generation of a web-page, via Net.Data and web server 29, to provide a global view of the ongoing tests to the operator.

In further view of FIG. 1, the control device 12, configured with the Segue SilkPerformer test control, initiates the web-server testing by sending the test scripts to each of the test agents 14a–14n. Using the enhancement of the invention, when a test script is created, only a test ID need be coded into the script directly, which is sufficient to enable retrieval of the rest of the test configuration data from the server 29 and minimize the frequency of script-regeneration to compensate for new requirements.

Figure 2:
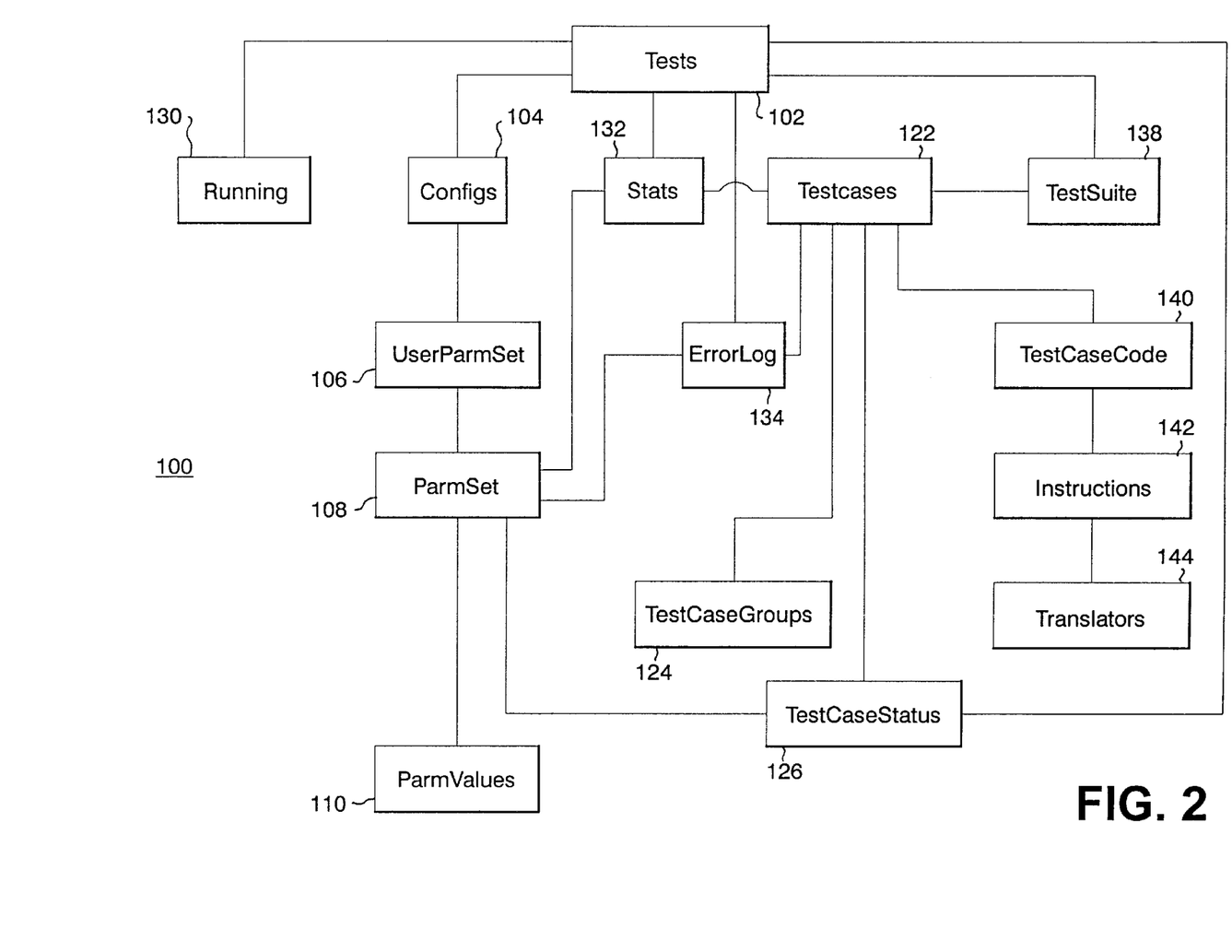
FIG. 2 is a block diagram illustrating conceptually the database organization for the Web-server testing tool of the invention.

FIG. 2 illustrates conceptually the database organization 100 for the web-based testing system 10, such as may be implemented in accordance with the DB2 product 25. As shown in FIG. 2, the data is organized into the following table categories: a "Tests" table 102 comprising definitions in the form of "TestID" numbers for each of the tests able to be performed by the virtual users (test agents); a "Configs" table 104 comprising configurations of =all of the virtual users, a test being associated with a ConfigID included in the Configs table; a "ParmSet" table 108 comprising test parameter sets which include the web-server test parameters for the types of testing desired. This ParmSet table is related with a "UserParmSet" table 106 for associating a ParmSet with a user ID ConfigID, and, is additionally related with a "ParmValues" table 110 which includes all of the test parameter values for the defined ParmSets (test parameter sets). Example test parameter values include values such as: network connection (modem) speed, Internet Browser type, delay between test cases, socket connection type, encryption type, graphics accepted, IP address simulated, etc. Further tables implemented in accordance with the invention include: a "TestCases" table 122 which includes definitions of all testcases(s); a "TestCaseGroups" table 124 which includes definitions of all testcase group(s); a "TestCaseStatus" table 126 which includes fields providing indication of enabled testcases(s); a "Stats" table 132 for receiving and storing statistics submitted to the Web server 29 (FIG. 1) and an "ErrorLog" table 134 for receiving errors submitted to the Web server on a regular basis; and, a "Running" table 130 which tracks users who are currently running tests. That is, a virtual user supplies a TestID number and a virtual "User ID" (number) for registry with the "Running" table 130 when executing a test.

As shown in FIG. 2, the database system organization 100 may further include tables providing an increased level of functionality. For instance: a "TestSuite" table 138 may be provided for storing which testcases and version were run in a given test for use as a future regression test bucket; a "TestCaseCode" table 140 may be provided for storing pseudo-code for test cases; an "Instructions" table 142 may be provided for storing pseudo-code instructions which are translatable for a given tool; and, a "Translators" table 144 which may be used to spawn pseudo-code translators, i.e., which enable creation of test-tool specific scripts.

Figure 3A:
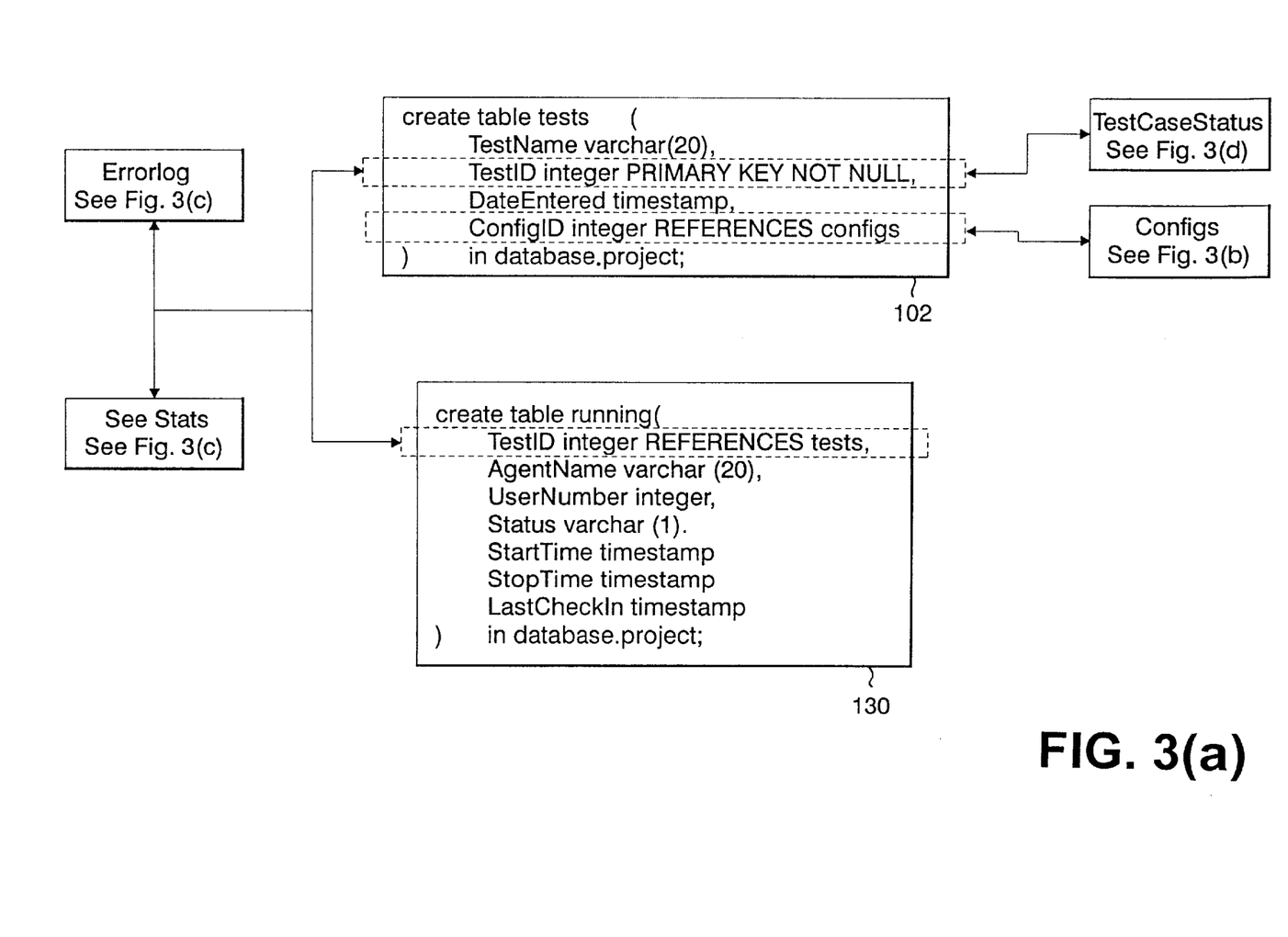
FIG. 3(a) is a detailed diagram illustrating the "Tests" and the "Running" database tables.

According to the invention, when a test is executed, the following steps are performed:

Step 1) A virtual user receives and executes a test script in the appropriate test language to query the server-side Tests table 102, via the Net.Data macro, to determine the "TestID" number associated with the test name that has been hard-coded in the test script. FIG. 3(a) illustrates one implementation of the Tests table 102, formulated in SQL, for example, which includes variables "Testname", i.e., a descriptive name of the test, the "TestID" which is the unique numeric ID number for the particular test, a "DateEntered" which is a date the test was created, and, "ConfigID" which is a pointer for referencing the Configs table 104 which lists all of the available test configurations, i.e., test parameter sets, for that test. According to the invention, the Net.data macro (FIG. 1) generates all DB2 table queries in SQL.

Step 2) The virtual user then "registers" with the Running table 130, by submitting its virtual "User ID" so the tool may track all running "virtual" users. The use of these tables overcomes the problem of not having a unique integer number for each user as the workload is distributed over multiple NT workstations. FIG. 3(a) illustrates the "Running" table 130 that a virtual user will "registers" with by submitting a TestID. As shown in FIG. 3(a), the table includes an "AgentName" variable which is the agent name recognized by the Segue Silkperformer tool; and, a "User-Number" which is a sequential number assigned to a registered user. A "Status" variable is provided which is a one character value indicating the test status, e.g., "S" for test started, "P" for test paused, "F" for test finished, and "O" for "Orphaned," which is used to identify users which haven't "checked in" in a reasonable amount of time, or, to identify if a user disappeared and failed to "check out". Other data fields are provided which indicate test "Starttime," "Stoptime" and "Lastcheckin" time.

Figure 3B:
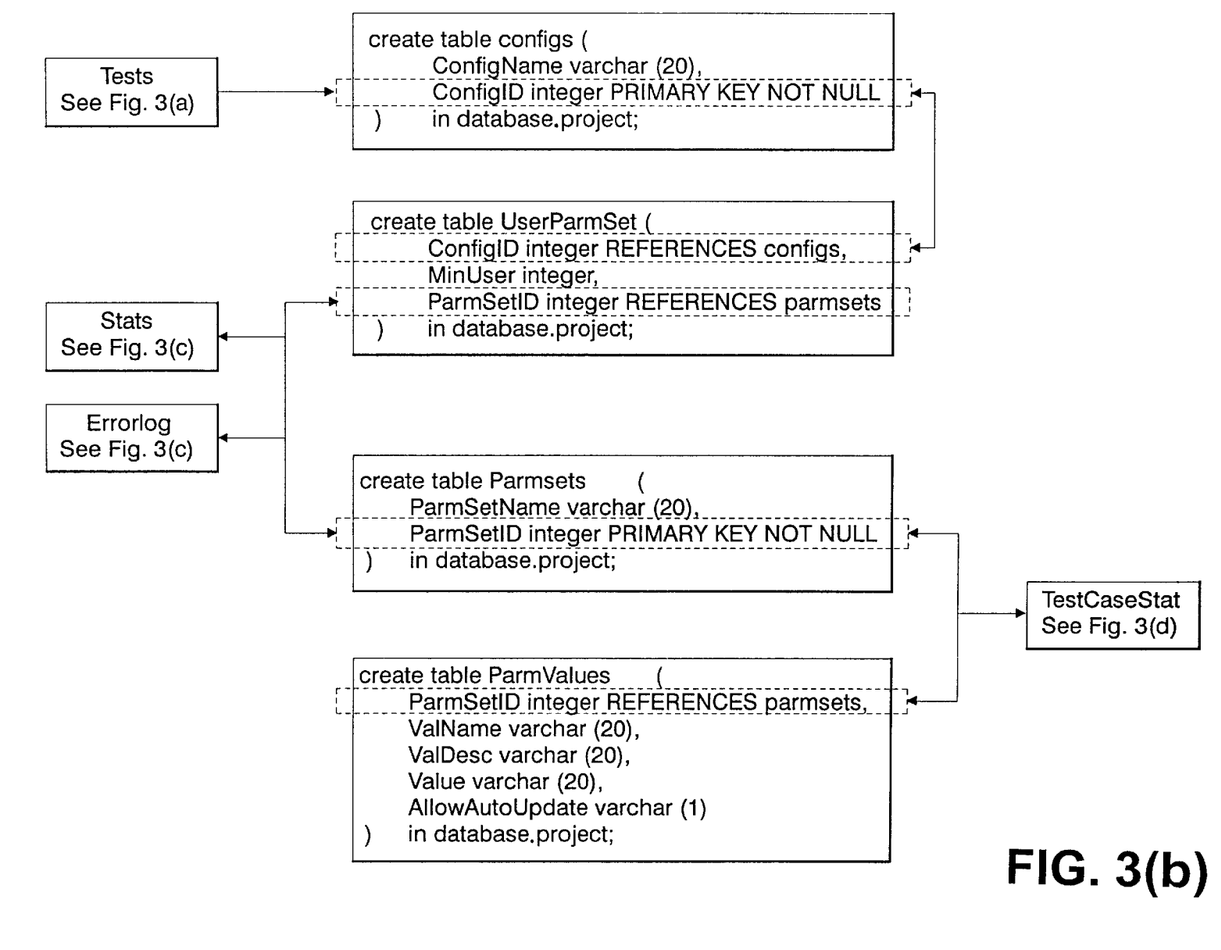
FIG. 3(b) is a detailed diagram illustrating the "Configs", "UserParmSet", "Parmsets", and "ParmValues" database tables.

Having received "TestID" number and the "User ID" numbers, the test configuration for this virtual user, is retrieved in accordance with the following steps:

Step 3) When the test was looked up in the first step (Step 1), a "ConfigID" was concurrently retrieved for the current test from the "Configs" table 104. FIG. 3(b) illustrates the "Configs" table 104 which includes a "ConfigName" variable for identifying the name of the test configuration, and the "ConfigID" specifying the unique numeric ID associated with the test configuration.

Step 4) Given the "ConfigID" number, a ParmSet to be used and associated with this user is then looked up from the UserParmSet table 106. For instance, the query to retrieve a ParmSet performs a search of the UserParmSet table 106 (FIG. 3(b)) for the row that has a matching ConfigID and the highest MinUser value which is less than or equal to the UserNumber. Thus, as shown in FIG. 3(b), the ConfigID value from the Configs table 104 references the UserParmSet table 106 which includes the constant "MinUser" identifying for specifying the minimum user number to use and, the "ParmSetID" which is a unique numeric ID used to reference the ParmSets table 108 which assigns the parameter set to a user. It is understood that the parameter set may be a parameter "cluster" and identified by a variable "ParmSetName". As further shown in FIG. 3(b), the "ParmSetID" references the ParmValues table 110 which comprises the values of all the test parameters. Through the use of the MinUser parameter different ParmSets may be associated with the users in a given Configuration. According to the preferred methodology, a user receives a UserNumber (or percentage number—if in "Percentage" mode) and stores that in a memory (not shown). When that virtual user attempts to find its parameters it will search the UserParmSet table for the highest MinUser less than or equal to the virtual user's own number for a given test. From that information, an associated ParmSet is located, and the user may retrieve their parameters. This is the table that enables multiple ParmSets to exist with a single Config ID.

Step 5) Given the ParmSetID, all associated parameter values for the ParmSet are retrieved from the "ParmValues" table 110 in the DB and downloaded to the user as an HTML page (web-based communication) formulated by the Net-.data macro 27 via the web server 29/network 30 pathway. Particularly, as shown in FIG. 3(b), the ParmValues table 110 includes a "ValName" variable indicating the name of the variable; an optional "ValDesc" variable providing a description of the variable; a "Value" variable indicating the value to be assigned to the variable; and, an "AllowAutoUpdate" which is a boolean variable used to determine if an autoupdate is required. That is, if the test tool determines that a testcase is failing, it may try to disable it via the Net.Data macro interface. While this may be beneficial in some situations, there are some situations when it is not desirable to allow the test tool to automatically update the status of testcases. Such an example includes the scenario where the testcase shuts down the entire test (by accident) because of too many failures. The "AllowAutoUpdate" mechanism is provided to indicate which testcases the tool may automatically update, and the Net.data macro adheres to this marking. As will be explained in greater detail, this is included as part of a feedback system.

Figure 4A:
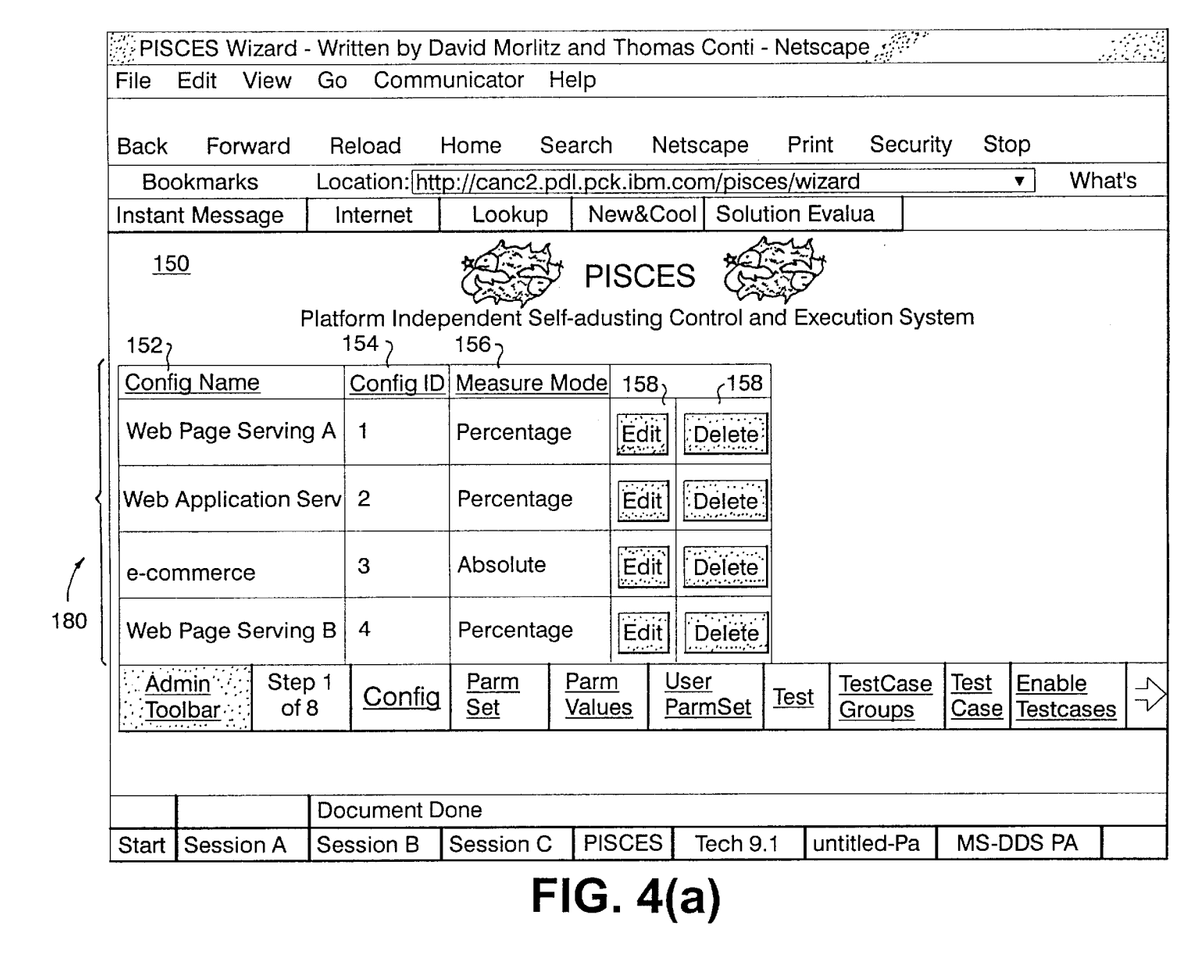
FIGS. 4(a)–4(c) illustrate example web-pages comprising information extracted from the database tables and accessible by executing test scripts for enhanced test execution control.
Figure 4B:
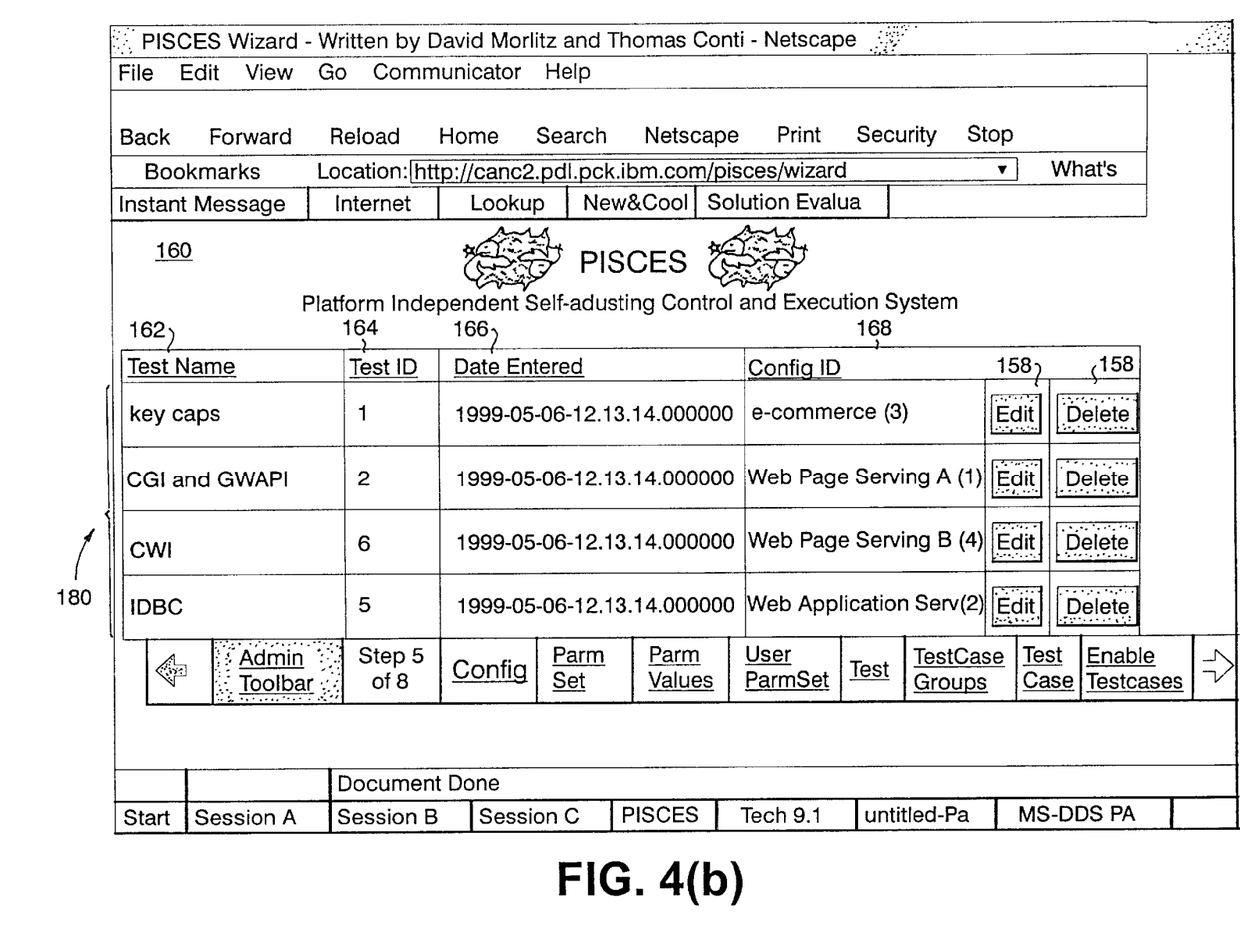
Figure 4C:
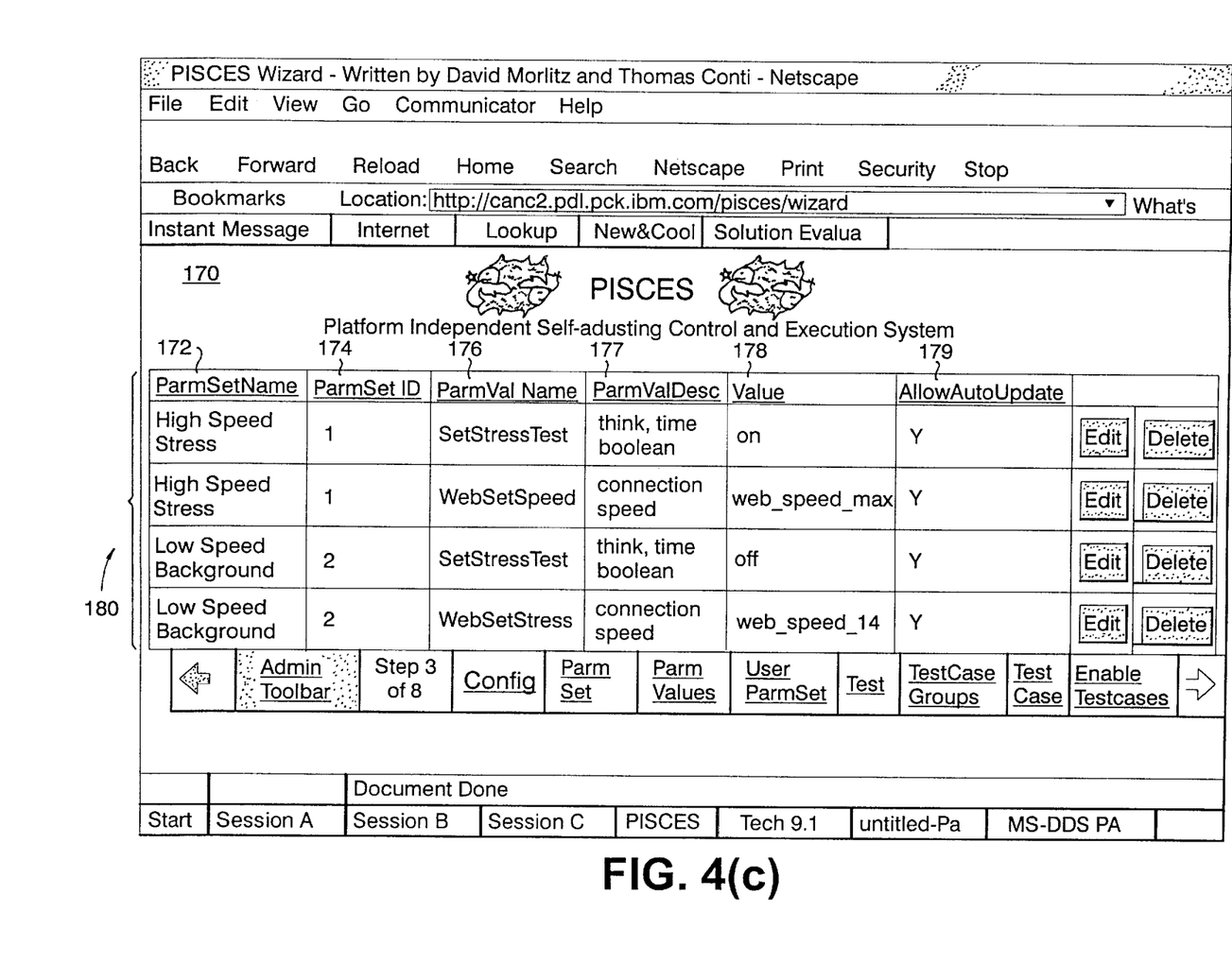

Step 6) The associated parameter values are downloaded as an HTML web page via the network pathway and imported into the "virtual" user by means of HTML page search functions provided by the test tool. An example web-page downloaded to the virtual user and including the test parameter values for the virtual user's test case is illustrated in FIG. 4(c). This web page may be received by the virtual user (FIG. 1) for parsing.

Step 7) The testing may now begin with the test configuration and test parameters as desired. It is understood that Step 5) through Step 7) may be repeated during test execution.

One benefit of the present invention is as follows: When an operator decides that a different test needs to be executed, all that is required is a simple update to the "Tests" table 102, with a new ConfigID for the Test ID via a Net.Data macro which changes the results of the parameter search and the test cases. Thus, in the manner herein described, global variables are provided enabling increased operator control of workload parameters (local and global), and accumulation of real-time statistics.

In accordance with the invention as readily seen in FIG. 1, test configuration and parameter information have been moved from the client side 11 to the server side 21. Consequently, a situation is created where the test tool is actually able to affect its own performance throughout the test, i.e., provide increased operator control over the workload once testing has been started. For example, when the tool determines that a test case is failing too frequently (as determined by the programmer of the test script) the test tool requests a Net.Data macro 27 (FIG. 1) which generates a web page including a form requesting that the executing testcase be turned off. Once this form is filled out, the Net.Data macro determines if the testcase is allowed to be automatically disabled by the test tool and proceeds accordingly. The next time that each virtual user checks the list of enabled testcases, the one turned off will no longer appear. Thus, only a single user experiences the testcase outage, and the other users do not have to handle known or broken testcases. The same is true for any parameter, depending on the way that the test scripts are coded. For example, a test script may be coded in such a way that if a virtual user determines that the transaction rate is too slow, then the UserParmSet table may be updated to switch the mode that the users are operating in via the Net.Data macro. This is a large global change, but the tool could just as easily change a single parameter in the ParmValues table to affect a single small piece of the entire test. This is now possible because the data resides on the central server outside the scope of the test tool and a "smart" interface has been created to permit/deny these types of operations.

Further to this, there is provided a mechanism for providing real-time statistics to determine if a workload is functioning properly or not. The web-server testing tool such as Segue's SilkPerformer, provides a web page response checking mechanism for determining whether a transaction worked properly or not. The mechanism of the invention provides an additional "global" view by counting how many transactions failed and how many worked across all agents and all users, even if all users are on a single machine. Thus, as will be explained in greater detail with respect to FIGS. 3(c) and 3(d), the DB2 Stats table 132 includes at least the following columns: TestID, ParmSetID, TestCaseID, version number, good count, and, bad count, whereby, via the Net.Data macro, each script may post their information after a given number of transactions completed. Then via the same Net.Data macro, in a different report block, an HTML page may be generated which shows cumulative results for the entire test across all agents. Preferably, this page is written in such a way that it would automatically refresh periodically, e.g., every minute.

A Net.Data macro is further provided that will format the results. That is, by moving this data into DB2, a Net.Data macro is executed so that, as the workload is running and an error threshold is reached, the workload may shut-off malfunctioning tests and notify the operator via e-mail or some other method. Thus, according to the invention, a count is maintained of how many times each transaction failed, and when a certain threshold (user determined) has been reached. At such time a certain threshold is reached, an automatic testcase disable function is performed. The actual code for determining a failure implements SegueSoftware's test tool standard scripting language, including an internal function WebParseResponseData that is used for parsing and locating certain characters in a returned web page.

```
function WebPostCheck (URL,
                      LBorder,
                      check,
                      connname,
                      tranname: string;
                      formname: form;
                      goodcount,
                      badcount: number;
           delay: float optional)
var
    responsepageSays: string (5000);
begin
    WebParseResponseData (responsepageSays, 100, LBorder);
    WebFormPost (URL, formname, delay);
    if strsearch (responsepageSays, check, STR_SEARCH_FIRST) > 0
    then
        goodcount := goodcount + 1;
        print ("Good response "+tranname + "(good:
"+string (goodcount) +",
bad: "+string (badcount) +")",1, TEXT_GREEN);
    else
        badcount := badcount + 1;
        print("Bad response "+tranname + "(good:
"+string (goodcount) +",
bad: "+string (badcount) +")" ,1, TEXT_RED);
    end;
// send stats to server every 10 transactions, for example,
// via logstats function for placement in web form via Net.Data macro;
    if (goodcount+badcount) mod 10=0 then
        logStats (connname, tranname, goodcount, badcount);
        print ("Logged "+connname+" "+tranname+" with (good:
"+string(goodcount)+", bad: "+string (badcount)+")", 1, TEXT_BLUE);
        goodcount: =0;
        badcount: =0;
    end;
end WebPostCheck;
```

Figure 3C:
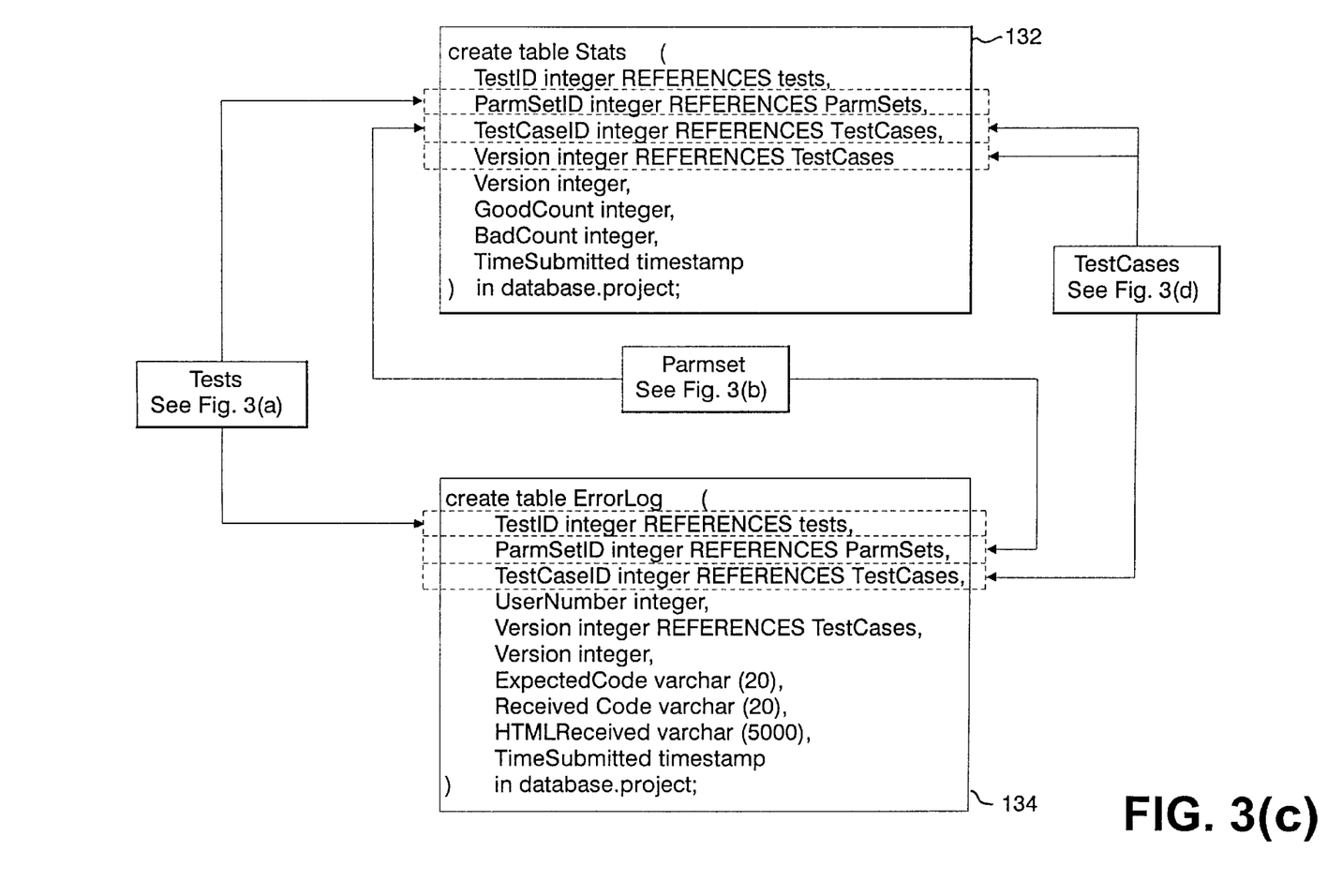
FIG. 3(c) is a detailed diagram illustrating the "Stats" and the "ErrorLog" database tables.

FIG. 3(c) illustrates the create table "Stats" 132 that is designed to hold the number of successful and failed transactions for all tests submitted by the test tool during a configurable time interval or, after a pre-determined number of good/failed transactions. As shown in the FIG. 3(c), the "Stats" 132 includes the TestID number from the Tests table 102 (FIG. 3(a)) that is used to identify the test the stats are directed to; the ParmSetID is the ID number from the ParmSets table 108 (FIG. 3(b)) to indicate what ParmSet produced these stats; the "TestCaseID" is an ID number from the TestCase table 122 (FIG. 3(d)) to indicate which testcase the stats are about; "Version" is the version number of the testcase that produced these results; GoodCount indicates the number of transactions of this testcase that have succeeded and "BadCount" indicates the number of transactions of this testcase that have failed; and, "Time-Submitted" indicates the time that the test tool submitted these stats. For example, one way in which statistics are maintained is by submission to the Stats table 132 every pre-determined number of transactions, e.g., ten (10) transactions (when good+bad=10) as shown and described below (FIG. 3(d)). Therefore, the actual number of transactions may be found when all of the stats with the same first four (4) fields together are summed. The DB 25 may also include a table that permits archiving of the stats (called StatsHistory) which is similar in design as the Stats table, except it has entries called "NumEntriesTotalled," "EarliestTestTime," "LatestTestTime" and "TimCumulated" and enables entry of all of the stats together as a single record in this table.

Figure 3D:
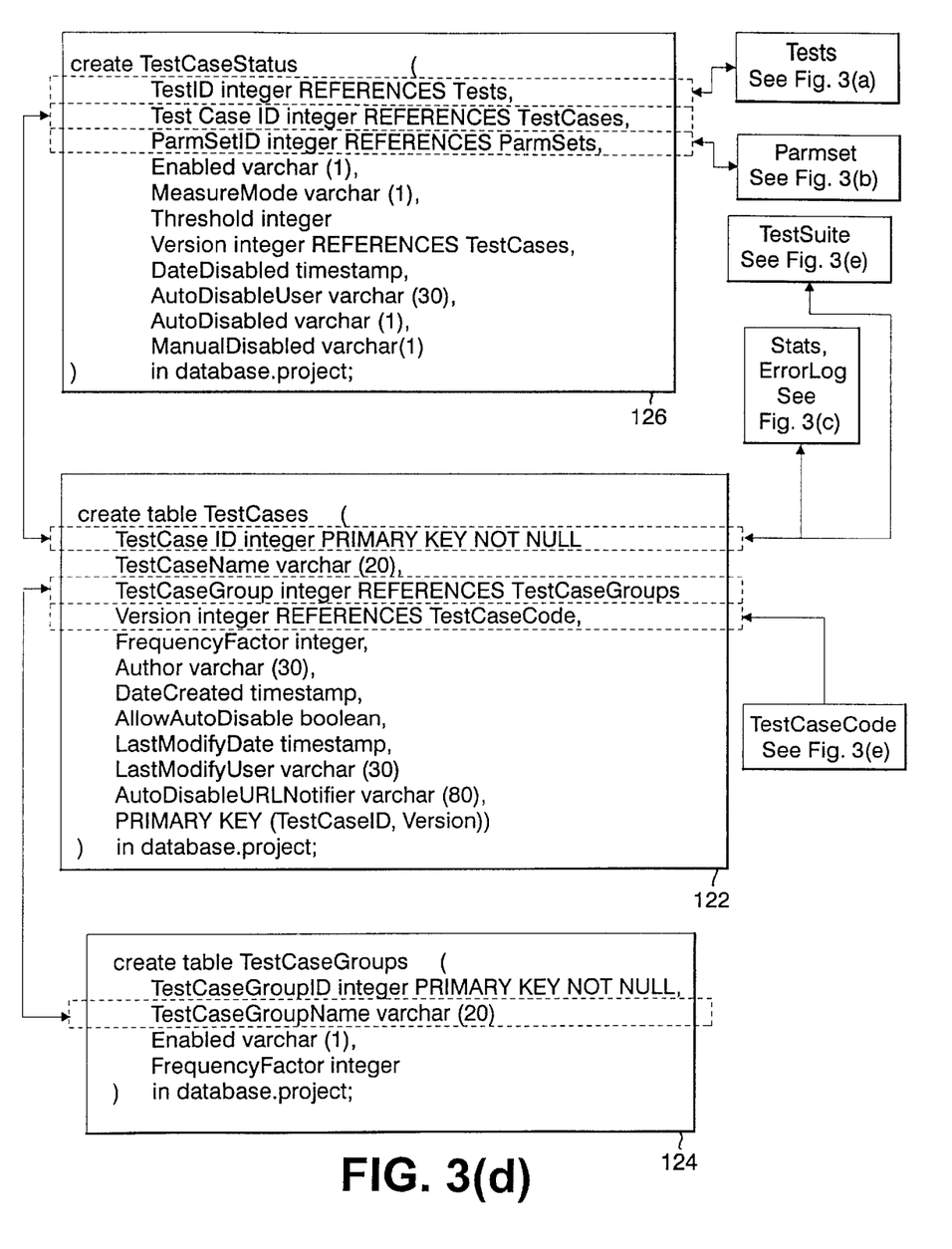
FIG. 3(d) is a detailed diagram illustrating the "TestCaseStatus", "TestCases" and "TestCaseGroups" database tables.

With respect to the "TestCases" database table 122 of FIG. 3(d), the following fields are provided: "TestCaseID" is a unique integer used to identify the TestCase and "Version" is the number indicating which TestCase version; "TestCase-Name" is the name of the test case and "TestCaseGroup" is the name of the test group that the test case belongs to (see the TestCaseGroup table 124 (FIG. 3(d)); the Frequency-Factor is a multiplier, e.g., ½, 1, 2, etc. provided to help determine the weighting of individual testcases in a TestCaseGroup and particularly, a value multiplied by a FrequencyFactor for the entire group to determine a random value weighting; the "Author" which indicates who wrote the testcase and the data the testcase was created as indicated in the "DateCreated" value; "LastModifiedUser" indicates who the last person was to update the testcase and the data it was updated as given in the "LastModifiedDate" variable; "AllowAutoDisable" which includes either a yes or no value "Y" or "N" indicating whether the testtool may update this record; and, "AutoDisableURL" which indicates what web page the tool needs to go to if it wants to automatically disable the testcase. Note that this is the first page the tool attempts to go to. The Net.Data macro at that page will then determine if it is allowed to disable the TestCase.

The "TestCaseGroups" table 124 illustrated in FIG. 3(d) is used to help classify testcases into categories. As shown in FIG. 3(d), the "TestCaseGroupID" is a unique integer identifying a given test case group and "TestCaseGroup-Name" is what this TestCaseGroup is called; "Enabled" provides an indication of whether this group is allowed to run and enables the turning off or turning on of all the TestCases for a TestCaseGroup in a single setting. To find if a specific TestCase is enabled, this value is put together in a boolean AND operation with the TestCaseStatus's "enabled" value by the SQL in the Net.Data macro as it computes the web page for return to the test tool. "FrequencyFactor" is the multiplier provided to help determine the weighting of testcases in a TestCaseGroup. For example, a number such as 100 may be used as the normal number. The Net.Data macro multiplies the frequency factor for the individual test cases with that of the associated TestCase-Group. These values are retrieved from the DB and used to determine the borders used to select a test when invoking the randomization function. Thus, if it is desired that all the testcases in this group be twice as likely to run, the FrequencyFactor value will be set to 2.

With respect to the "TestCaseStatus" database table 126 of FIG. 3(d), the TestID field represents the Test that this entry will affect; TestCaseID represents the TestCase within that test that this entry will affect; Version represents the version of the lo testcase that is currently executing; and ParmSetID indicates the ParmSet that this entry will affect. Thus, by having all of these parameters, TestCases which run within a given test may be modified, or just for a subset of those users which are running in a given ParmSet. This granularity is helpful as it may be desirable not to make broad changes to the test, thus providing a greater degree of optimization. Enabled is a value indicating whether a testcase is enabled for the given TestID and ParmSetID. "MeasureMode" is a value indicating how errors are measured. For instance, a value "A" represents "Absolute" mode for indicating that when an exact number of errors are reached (given a Threshold number) then the tool will attempt to disable the testcase. A value "P" represents a "Percentage" mode indicating that when a fraction of a given threshold of errors are reached, for example, according to the formula:

$$P = \frac{\text{bad\_count}}{\text{bad\_count} + \text{good\_count}} \times 100\%,$$

then the tool will attempt to disable the testcase. A "MeasureMode" value "H" representing "Hourly" (e.g., in clock hours), indicating that when the Threshold is reached within that clock hour, the tool will try to disable the testcase. For example, even though the test may be started at 10:30, the hour will be up at 10:59 and the count will be reset when the hour turns to 11:00 (regardless of the minutes). "Threshold" is the integer value used by the tool to determine how many errors (per virtual user) are acceptable before trying to disable the testcase; "AutoDisableUser" is a field indicating the identity of the virtual user who turned off the testcase; "AutoDisabled" including a value indicating whether a virtual user turned the testcase off (i.e., automatically); and, "ManualDisabled" indicating whether an operator turned the testcase off (i.e., manually). These last AutoDisabled and ManualDisabled entries thus provide the reason as to why the testcase was disabled, which is desirable as the testing operator may want to re-enable all auto-disabled testcases, but not manually disabled testcases.

As further shown in FIG. 3(c), an ErrorLog table 134 is provided and utilized for the diagnosis of error conditions. When the virtual user encounters an unexpected condition, it writes an entry in this table. The fields from TestID to Version are the same as in the Stats table 132. The entry "UserNumber" represents which virtual user in the test found the particular error; "ExpectedCode" is a variable indicating what that particular user was looking to find; "ReceivedCode" is a variable indicating what that particular user actually did see from the web server; "HTMLReceived" is an entry that enables the saving of all the HTML received, as there is information included in it required for debugging problems; and, "TimeSubmitted" is a value indicating at what time the error was noticed.

As mentioned, via the Net.Data macro HTML pages may be generated which shows results and status for tests performed by all agents. FIGS. 4(a)–4(c) illustrate example web-pages, including frames 180 that include TestTool data readable by scripts to enable the test configuration for virtual users of the system. Particularly, the web pages are provided in a data format (not shown) usable by the scripts and comprise the data included in the frame 180. However, the web-pages of FIGS. 4(a)–4(c) may also be presented for user display as shown. For example, as shown in FIG. 4(a), the web-page 150 enables an operator to view, delete and edit the "Configs" table 104 in the DB2 system 100 comprising the configurations of the virtual users. Thus, as shown in FIG. 4(a), there is a column 152 indicating the configuration name, a column 154 indicating the corresponding Config ID, and a column indicating the measuring mode 156, e.g., Percentage or Absolute, and the edit operations buttons 158 (for user mode). In the example shown in FIG. 4(b), the web-page 160 enables an operator to view, delete and edit the "Tests" table 102 comprising definitions in the form of "TestID" numbers for each of the tests to be performed by the virtual users (test agents). Thus, as shown in FIG. 4(b), there is a column 162 indicating the "TestName," a column 164 indicating the corresponding "TestID", a column 166 indicating "Date Entered", and a column 168 indicating the corresponding "ConfigID" as shown with respect to FIG. 4(a). In the example shown in FIG. 4(c), the web-page 170 enables an operator to view, delete and edit the "ParmValues" table 110 comprising the definitions of the parameter values for defined ParmSets (test parameter sets) Thus, as shown in FIG. 4(c), there is a column 172 indicating the "ParmSetName," a column 174 indicating the corresponding "ParmSetID", a column 176 indicating the "ParmValueName", a column 177 indicating the "ParmValueDesc", a column 178 indicating the "Value" of the parameter and, a column 179 indicating whether the "AllowAutoUpdate" mechanism is enabled which enables the automatic feedback mechanism indicating which testcases the tool may automatically update.

With respect to the autofeedback mechanism, the test tool performs periodic monitoring of the TestCaseStatus table to determine if a user should either enable or disable a specific transaction or group of transactions (testcases), and, specifically, to control what testcases are executing in a given run. In the preferred embodiment, before or during execution of a test, an executing script will check the "enabled" field of the Testcase Status table to determine if a particular testcase is to be skipped. In this manner, workload may be controlled because the web page may be edited to reflect working/broken testcases and the tool will "notice" a change in the web page each time it is looked at. This check may be made at any predetermined frequency, such that, any change may be immediately noticed by all subsequent users who check the TestCase status table. Therefore, near instantaneous control over which transactions run and which are to be skipped is provided. The referred to TestCaseGroup table is the manner in which testcase workload may be classified into larger groups. By toggling the "enabled" field in the TestCaseGroup table global changes may be made, (e.g., all DB2 transactions may be disabled) in a single "swipe". Due to the nature of the database tables (TestCaseStatus et al.), different statements may be had for different tests. As the statements appear as additional rows in the table, increased granular control over test execution is attained. It is understood that table may be further enabled to provide any boolean data that may be desired for the workload.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. An apparatus for dynamically controlling the testing of a web-based server device comprising:

one or more test devices in communication with a web-based server device via a respective network connection, each said test device capable executing a test script for simulating a plurality of web-based users, each test script capable of extracting test information from a web-based communication;

control mechanism for configuring each test device in accordance with an initial web-based workload simulation;

database for storing test configuration and test parameter information in varying degrees of granularity for each simulated web-based user, said test configuration information comprising one or more test cases for a test simulation, said test configuration associated with a simulated web-based user;

means for retrieving and updating said configuration and test parameter information from said database according to a desired test simulation and generating a web-based communication for download to said control mechanism for test initiation, said control means including means for tracking status of executing test cases and for tracking real-time statistics relating to successful or unsuccessful test case simulation results, said test case status and real-time statistics being stored and updated in said database; and comparison means for determining from said database whether said test simulation results that are unsuccessful exceeds a pre-determined threshold and setting said flag to indicate a test case to be disabled when said threshold is exceeded, said test device including means responsive to said flag for disabling a test case during test execution, wherein a further web-based communication is generated that includes information including said flag, said information accessible by a test script for dynamically reconfiguring said test devices during test execution.

2. The apparatus according to claim 1, wherein said database includes a look-up table for associating said test configuration with a simulated web-based user.

3. The apparatus according to claim 2, wherein each said test case includes one or more testing parameters, said database comprising a look-up table for associating test parameters associated with each test case executed by a web-based user.

4. The apparatus according to claim 2, further including a registry look-up table for tracking current simulated users executing test scripts on said server.

5. The apparatus according to claim 2, wherein said database includes a look-up test case status table for tracking status of executing test cases, said look-up test case status table including a flag for indicating a test case enablement, said flag capable of being included in a further web-based communication.

6. The apparatus according to claim 5, wherein said database includes a statistics look-up table for receiving tracked and updated real-time statistics relating to successful or unsuccessful test case simulation results.

7. The apparatus according to claim 2, further including a look-up test case group status table including a plurality of test cases directed to a particular test category, said test case group status table including a disable flag for indicating a plurality of test cases to be disabled, said test device includes means responsive to said flag for disabling all test cases indicated in said test case group.

8. The apparatus according to claim 6, wherein said means for tracking real-time statistics relating to successful or unsuccessful test case simulation results includes:

means for extracting test case simulation results for enabling said dynamic feedback control of said test devices during test execution; and, means for generating a flag for enabling automatic update of a test case simulation results record in a database table.

9. The apparatus according to claim 1, wherein a test script further includes a weighting factor for indicating whether one or more test cases will be executed in a given test simulation.

10. The apparatus according to claim 1, further including:

a look-up table for associating a test configuration with a test identified to be run in a test script;

a look-up table for associating one or more test parameter sets with a test configuration; and, a look-up table for associating test parameter values with each test parameter indicated in said set, wherein different test parameters may be assigned to different users who are all running the same test.

11. A method for dynamically testing a web-based server device comprising:

providing test scripts to one or more test devices for simulating a plurality of web-based users for testing said web-based server, each said one or more test devices executing one or more test scripts;

maintaining a database associated with said web-based server for storing test configuration and test parameter information in varying degrees of granularity for each simulated web-based user;

retrieving and updating said test configuration and test parameter information in said database according to said desired test simulation and generating a web-based communication for download to a control mechanism for test initiation;

tracking real-time statistics relating to successful or unsuccessful test case simulation results and storing said results in a statistics look-up table;

determining whether unsuccessful test case results in said statistics look-up table exceeds a pre-determined threshold and setting said disabling flag for indicating a test case to be disabled when said threshold is exceeded; and, generating a further web-based communication that includes information including said flag, said information accessible by a test script for dynamically reconfiguring said test devices during a test simulation.

12. The method according to claim 11, wherein said step b) of retrieving and storing said test configuration and test parameter information in said database further includes a step of associating said test configuration in a database look-up table with a simulated web-based user via a test case identifier provided in a test script.

13. The method according to claim 11, wherein a test case includes one or more testing parameters, said step b) of retrieving and storing said test configuration and test parameter information in said database further includes the steps of:

associating a test configuration with a test identified to be run in a test script;

associating one or more test parameter sets with a test configuration; and, associating test parameter values with each test parameter indicated in said set for execution thereof.

14. The method according to claim 13, further including the step of tracking current simulated users executing test scripts on said web-based server.

15. The method according to claim 13, further including the step of maintaining a look-up test case status table including a test case disable flag, said step of enabling dynamic feedback control of said test devices includes downloading said test case disabled flag in said further web-based communication, and responding to said flag for disabling a test case during test execution.

16. The method according to claim 15, wherein said database further includes indication whether a test result for a test case is to be automatically updated in said database, said step of tracking real-time statistics relating to successful or unsuccessful test case simulation results further including the steps of: checking setting of said automatic update indication in said database; and, if set, enabling automatic update of a test case simulation result record associated with said test case in said database table.

17. The method according to claim 11, further including the step of determining a weighting factor for a test case execution in a test script; and, indicating whether said test case will be executed in a given test simulation based on said weighting factor.

18. A program storage device readable by a machine, tangibly embodying a program of instructions executable by the machine to perform method steps for dynamically testing a web-based server device, said method steps comprising:

providing test scripts to one or more test devices for simulating a plurality of web-based users for testing said web-based server, each said one or more test devices executing one or more test scripts;

maintaining a database associated with said web-based server for storing test configuration and test parameter information in varying degrees of granularity for each simulated web-based user;

retrieving and storing said test configuration and test parameter information in said database according to said desired test simulation and generating a web-based communication for download to a control mechanism for test initiation;

tracking real-time statistics relating to successful or unsuccessful test case simulation results and storing said results in a statistics look-up table;

determining whether unsuccessful test case results in said statistics look-up table exceeds a pre-determined threshold and setting said disabling flag for indicating a test case to be disabled when said threshold is exceeded; and, generating a further web-based communication that includes information including said flag, said information accessible by a test script for dynamically reconfiguring said test devices during a test simulation.

* * * * *